(12) United States Patent
Doggett, III et al.

(10) Patent No.: US 7,920,297 B2
(45) Date of Patent: Apr. 5, 2011

(54) SYSTEM AND METHOD FOR PRINTING USING VARIABLE-DENSITY WHITE INK UNDER-PRINTED LAYER

(75) Inventors: William K. Doggett, III, Acton, MA (US); Jay T. Moody, Wayland, MA (US); Anatoliy V. Tsykora, Wayland, MA (US); Jacob A. Hyman, Cambridge, MA (US)

(73) Assignee: Vistaprint Technologies Limited, Hamilton (BM)

( * ) Notice: Subject to any disclaimer, the term of this patent is extended or adjusted under 35 U.S.C. 154(b) by 467 days.

(21) Appl. No.: 12/032,765

(22) Filed: Feb. 18, 2008

(65) Prior Publication Data

US 2009/0207458 A1 Aug. 20, 2009

(51) Int. Cl.
*B41C 1/02* (2006.01)
*G06F 15/00* (2006.01)
*B41J 11/00* (2006.01)

(52) U.S. Cl. .................. 358/3.29; 358/1.9; 347/175
(58) Field of Classification Search .................... 358/1.9, 358/518, 516, 520, 527, 530, 500, 1.1, 3.29, 358/3.32, 1.16, 1.18; 437/15, 175, 176, 203; 382/167, 162
See application file for complete search history.

(56) References Cited

U.S. PATENT DOCUMENTS

| | | | | |
|---|---|---|---|---|
| 5,521,722 | A * | 5/1996 | Colvill et al. | 358/500 |
| 6,355,403 | B1* | 3/2002 | Bourdelais et al. | 430/394 |
| 2001/0020973 | A1* | 9/2001 | Akada et al. | 347/213 |
| 2003/0007164 | A1* | 1/2003 | Lee et al. | 358/1.9 |
| 2003/0211269 | A1* | 11/2003 | Rieger et al. | 428/40.1 |
| 2005/0233241 | A1* | 10/2005 | Aylward et al. | 430/126 |
| 2007/0104899 | A1* | 5/2007 | Pearl et al. | 428/32.24 |
| 2007/0188535 | A1* | 8/2007 | Elwakil et al. | 347/15 |
| 2009/0136721 | A1* | 5/2009 | Staub et al. | 428/195.1 |
| 2009/0140649 | A1* | 6/2009 | Christiansen | 313/509 |
| 2009/0296173 | A1* | 12/2009 | Mestha et al. | 358/518 |
| 2009/0317595 | A1* | 12/2009 | Brehm et al. | 428/172 |

FOREIGN PATENT DOCUMENTS

| | | |
|---|---|---|
| EP | 1206121 A | 5/2002 |
| EP | 1835725 A | 9/2007 |
| WO | WO2007/099554 A | 9/2007 |

* cited by examiner

*Primary Examiner* — Madeleine A Nguyen
(74) *Attorney, Agent, or Firm* — Jessica J. Costa

(57) ABSTRACT

Techniques for generated variable density mono-color underprint layer(s) for printing underneath an image on a substrate to improve the appearance of the printed image.

52 Claims, 9 Drawing Sheets

PRIOR ART

SYSTEM AND METHOD FOR PRINTING USING VARIABLE-DENSITY WHITE INK UNDER-PRINTED LAYER

FIELD OF THE INVENTION

This invention relates to printing images and, more particularly, to improving the quality of printed images using a variable-density mono-color under-print layer.

BACKGROUND OF THE INVENTION

Digital images are commonly printed onto paper and other substrates such as fabrics. In the printing industry, the quality of a printed image on a product depends on several factors. Some factors, such as substantive content and resolution of the digital image depend on the particular image itself. Others, such as the type and the color of the substrate on which the image is to be printed, affect the appearance of the image on the printed product. For example, textile substrates (i.e., fabrics) are known to absorb the ink, often resulting in visible fabric weave patterns in the printed image. The fabric therefore often acts as a physical filter which gives the appearance of having actually decreased the resolution from a higher-resolution original image.

Still other factors, such as the type, quality, and opacity of the ink, affect the appearance of the printed image. For example, colored inks (cyan, magenta, yellow, and black) are typically not fully (i.e., 100%) opaque, and colors of the image that have high contrast with the color of the substrate on which they are printed often appear faded. To remedy this problem, printers often first print a layer of fully opaque white ink over the entire area of the surface of the substrate that the image is to be printed on prior to printing the image itself. However, while this solution remedies the luminosity problems in the lighter colors of the printed image, it can present problems with the darker colors. Because the darker colors are generally not fully opaque, they can appear faded when printed over the white ink under-print layer. In addition, when printed on some substrates such as fabric, some of the white ink may even show completely through the dark ink, causing the resulting dark areas to appear faded and/or grainy.

In the field of printing designs onto apparel, some printing systems are particularly adapted to printing designs on dark materials. As described above, these systems typically first print a layer of white ink and then print the design on top of the white ink layer. This may result in better color reproduction of the design, but especially images with a higher percentage of lighter colors, using such a system is more expensive to purchase and operate. The system itself contains additional white ink printing components, additional white ink is required, the printing process is slower because of the extra printing steps, and the drying time is longer because of the additional ink that is applied.

There is, therefore, a need for systems and methods that improve the quality of a printed image.

SUMMARY OF THE INVENTION

Embodiments of the invention are directed to generating variable density under-print layers for printing directly beneath images. The opacity of each pixel in a density mono-color under-print layer is determined according to the color characteristics (such as luminosity or hue) of the corresponding image pixel.

In accordance with one embodiment of the invention, a computer-implemented method for generating a variable density mono-color under-print layer corresponding to an image to be printed includes steps of receiving a printable image having a plurality of first pixels, and generating a mono-color under-print layer, the mono-color under-print layer comprising a plurality of second pixels, each second pixel corresponding to a first pixel in a same corresponding position in the printable image and each second pixel having an associated opacity whose value is based on at least one color characteristic of its corresponding first pixel.

In accordance with another embodiment, a method for printing an image having a plurality of areas of varying luminosity onto a substrate includes the steps of printing at least one variable density mono-color under-layer onto a substrate in a pre-determined position, areas of varying opacity of the mono-color in the under-layer corresponding to areas of varying luminosity in the image to be printed, and printing the image over the under-layer at the pre-determined position on the substrate.

It is an advantage of the invention that the brightness and hue of lighter overprinted colors are improved while preserving darkness and detail in darker ink areas when printing a design image on a dark substrate.

These and other objects, features and advantages of the invention will be better understood with reference to the accompanying drawings, description and claims.

DETAILED DESCRIPTION

Figure 1:
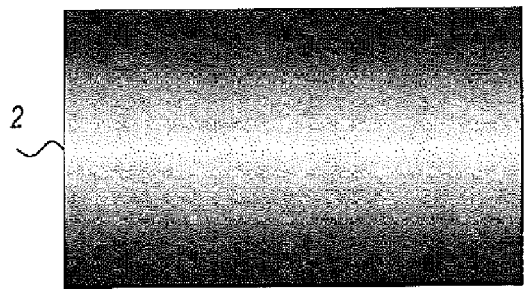
FIG. 1 is a combinational diagram illustrating an image printed on a substrate using a prior art printing technique.
Figure 1:
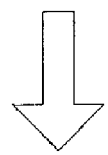
Figure 1:
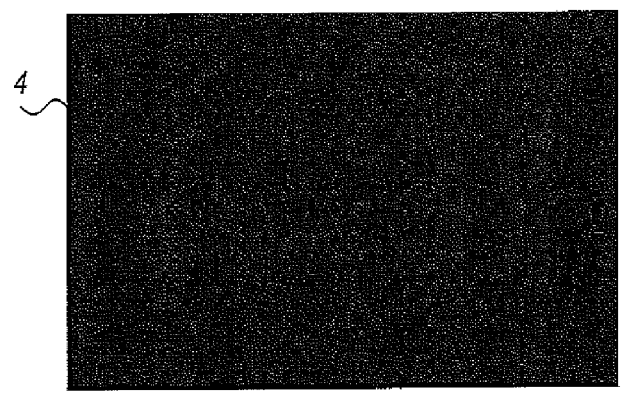
Figure 1:
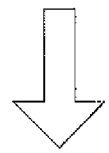
Figure 1:
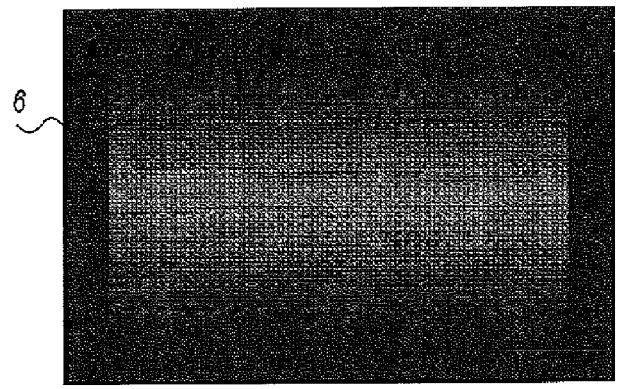

For a better understanding of the advantages conferred by various embodiments of the present invention described herein, an example illustration of the challenges of printing images is first discussed. FIG. 1 illustrates an example image 2 in the form of a simple rectangle with varying degrees of color and/or luminosity. Although shown in grayscale due to the black-and-white drawing requirements of the Patent Office, it is to be understood that the image 2 may be multi-colored and that each grayscale level in the image 2 may represent a different color.

In a digital image, the way a color is represented depends on the color model used by the particular system. For example, the RGB (red, green, blue) color model is a simple additive model, wherein the intensity of each component (red, green and blue) of a color is represented on a scale of 0 to 255, where 255 represents full intensity. The individual color values are then added to give the overall color. Black is represented by the RGB(0,0,0); white is represented by (255, 255, 255); red is represented by RGB(255,0,0); Blue is represented by RGB(0,0,255); Green is represented by RGB(0,255,0); Cyan is represented by RGB(0,255,255), Magenta is represented by RGB(255,0,255), Yellow is represented by RGB(255,255,0), and other colors are represented by various other combinations of the RGB component colors.

An alternative color model is the HSL (hue, saturation, luminosity) model which represents the color of a pixel in terms of hue (pure color), saturation (intensity of the color), and luminosity (brightness). Other color models exist and there are known techniques in the art for characterising a color, and for characterising differences in colors of different pixels.

Each color may have various levels of luminosity or brightness, where the whiter they appear in the grayscale image 2, the higher the luminosity or brightness of the corresponding pixel in the image. Of course, the image 2 may also be a grayscale image, for example as shown, and each grayscale level represents at least a luminosity level, but typically represents a combination of hue, saturation, and luminosity.

In FIG. 1, the image 2 is to be printed on a background substrate 4. In the illustrative embodiment, the background substrate 4 is a relatively dark color, which appears dark gray in grayscale as shown.

The image 2 is printed on the substrate 4 to produce a printed image 6. The printed image 6 in FIG. 1 illustrates a problem often encountered when printing images on substrates of low-contrast color where the ink is not 100% opaque, and also on substrates such as fabric or textiles which tend to absorb or otherwise disperse the ink. As illustrated, the printed image 6 may appear faded and/or grainy because the color of the substrate and texture of the substrate is either actually visible through the ink, or reduces the brightness of the contrasting image colors. For example, because the color of the substrate 4 is relatively dark, the lighter colors such as the bright white center strip in the image 2 appear less bright in the printed image 6. The darker colors of the image 2, for example near the top and bottom of the image 2, appear dark as expected because the dark color of the substrate 4 only serves to assist in making the printed image in these areas appear darker. However, the range of luminosity over the entire image is much lower than the range in the original image 2.

Figure 2:
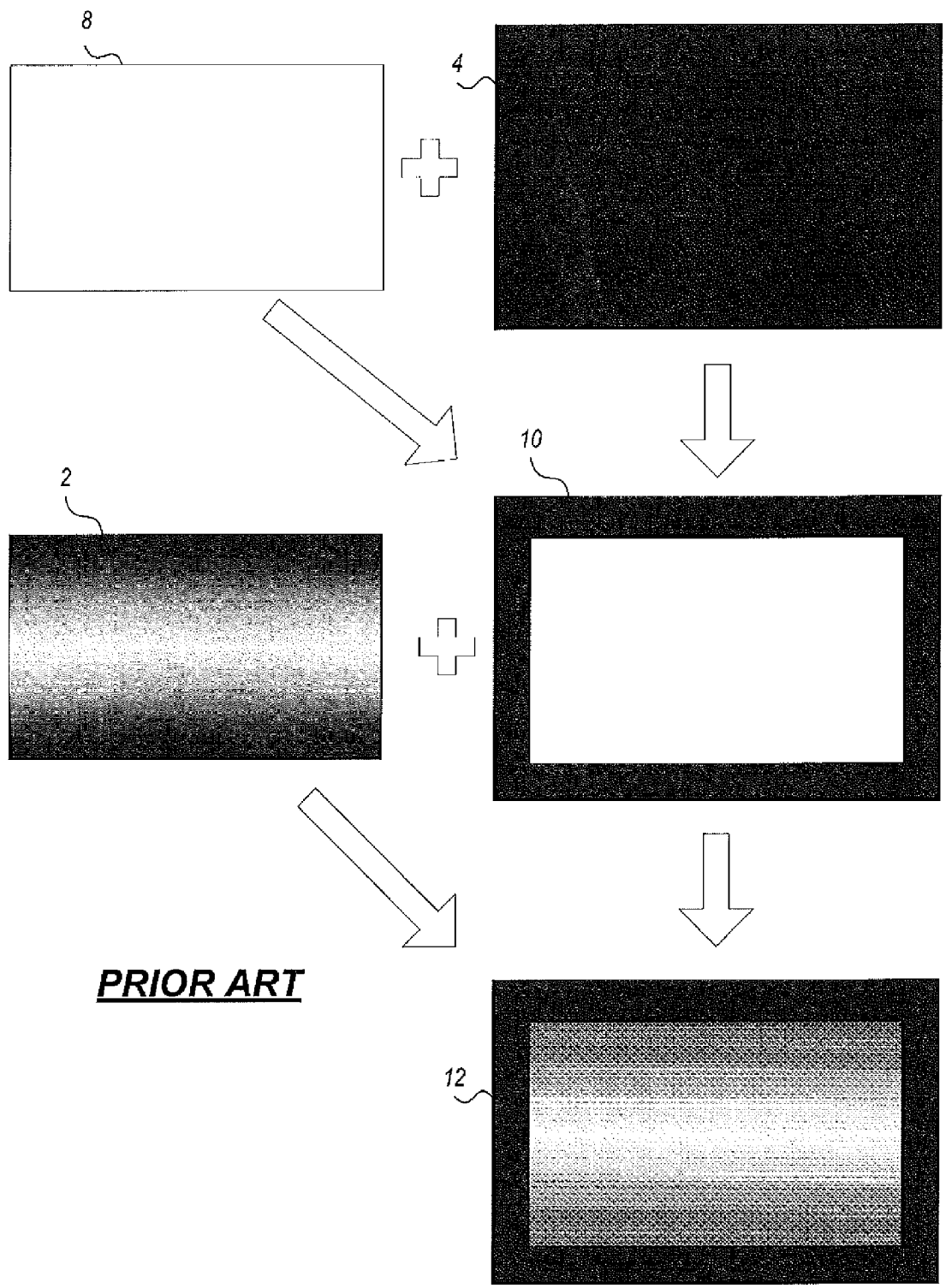
FIG. 2 is a combinational diagram illustrating an image printed on a substrate using an alternative prior art printing technique.

In the prior art, printers have attempted to remedy this problem by printing a solid color (typically white) under-print layer 8, as shown in FIG. 2, beneath the image. Thus, prior to printing the image 2, the white under-print layer 8 is first printed on the substrate 4 in the position that the image 2 is to be printed. The image 2 is then printed over the printed under-print layer on the substrate 10 to generate the final printed image 12. However, as illustrated in FIG. 2, this leads to opposite problems. That is, while the white under-print layer technique makes the brighter pixels in the image appear suitably bright in the printed image 12, the pixels in original image 8 which contrast with the color of the under-print layer 8 appear faded when printed over the white under-print layer. Thus, in FIG. 2, the dark areas at the top and bottom of the original image 2 appear faded in the printed image 12.

In accordance with embodiments of the invention, a variable density mono-color under-print layer is created for each image and printed on the substrate in the position of the image to be printed thereon prior to printing the actual image. The variable density mono-color under-print layer includes a plurality of pixels corresponding to same-location pixels in the image. Each under-print layer pixel has an associated opacity level which is set based on at least one color characteristic (such as color, hue, luminosity, saturation, etc.) of the under-print layer pixel's corresponding image pixel. Preferably, the mono-color is set to a high-contrast color relative to the color of the substrate on which the image is to be printed. For example, if the substrate color is to be a dark color such as black, the ink color of the under-print layer is preferably set to a light color such as white. Likewise, if the background color is to be a light color such as white, the ink color of the under-print layer is preferably set to a dark color such as black. The opacity level of a given under-print layer pixel is set to a relatively higher level when the difference between the luminosity level of the corresponding image pixel and the substrate color is relatively high. Thus, when the substrate is dark and the image pixel is light, the under-print layer pixel is given a relatively high opacity value, and the mono-color is set to a light color to contrast with the substrate color. Conversely, when the substrate is light and the image pixel is dark, the under-print layer pixel is also given a relatively high opacity value, but the mono-color is set to a dark color to contrast with the substrate color.

Figure 3:
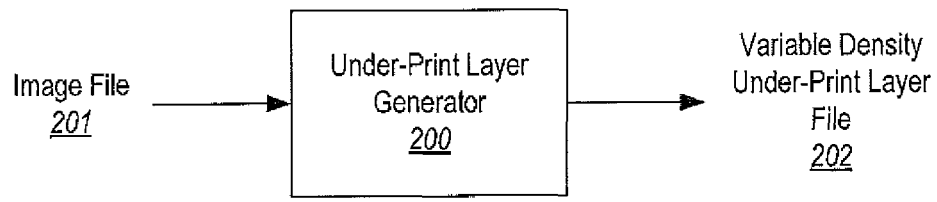
FIG. 3 is a block diagram of a variable density mono-color under-print layer generator.
Figure 6:
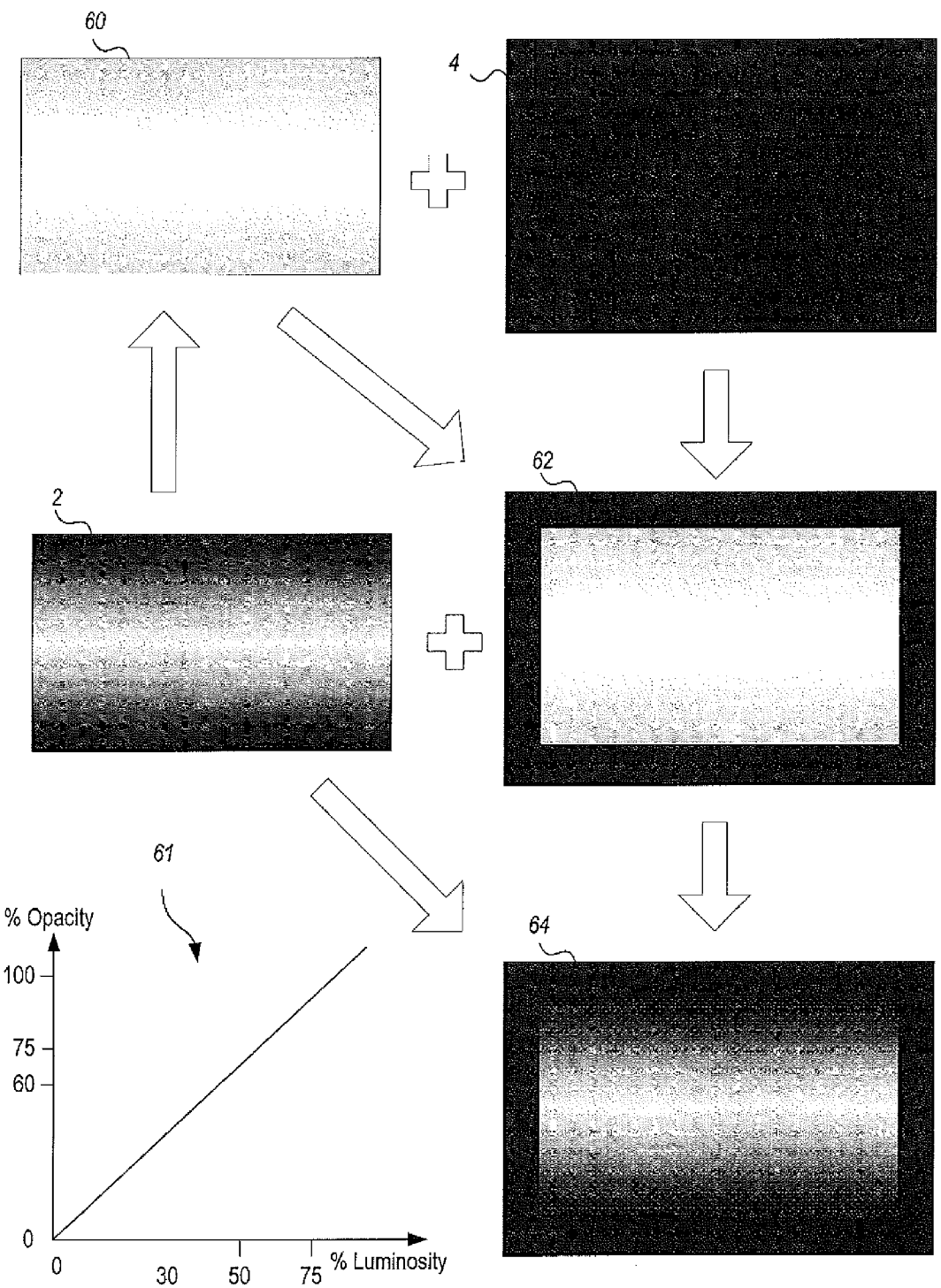
FIG. 6 is a combinational diagram illustrating an image printed on a substrate using a printing technique according to an exemplary embodiment of the invention.
Figure 8:
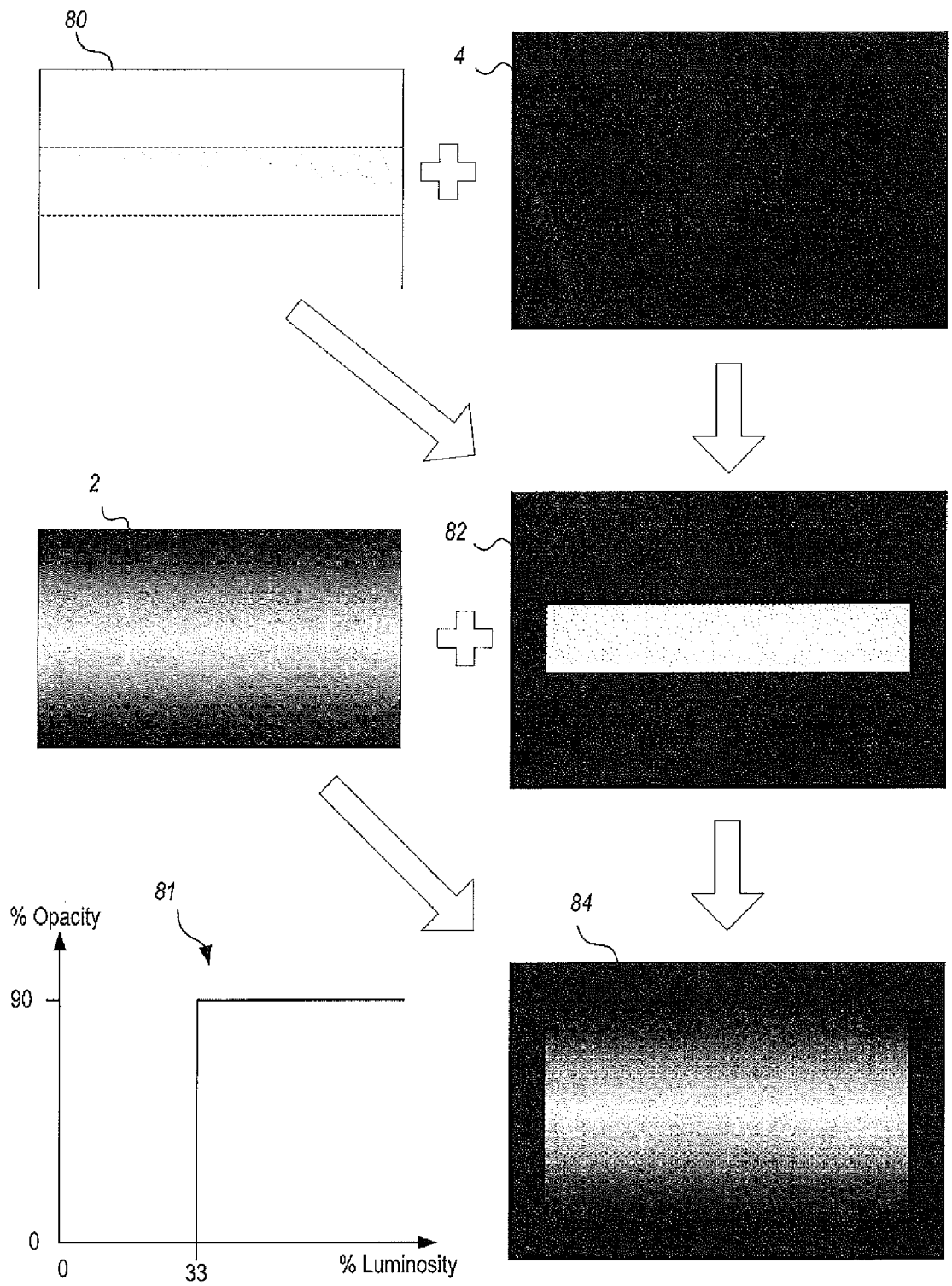
FIG. 8 is a combinational diagram illustrating an image printed on a substrate using a printing technique according to an alternative exemplary embodiment of the invention.
Figure 9:
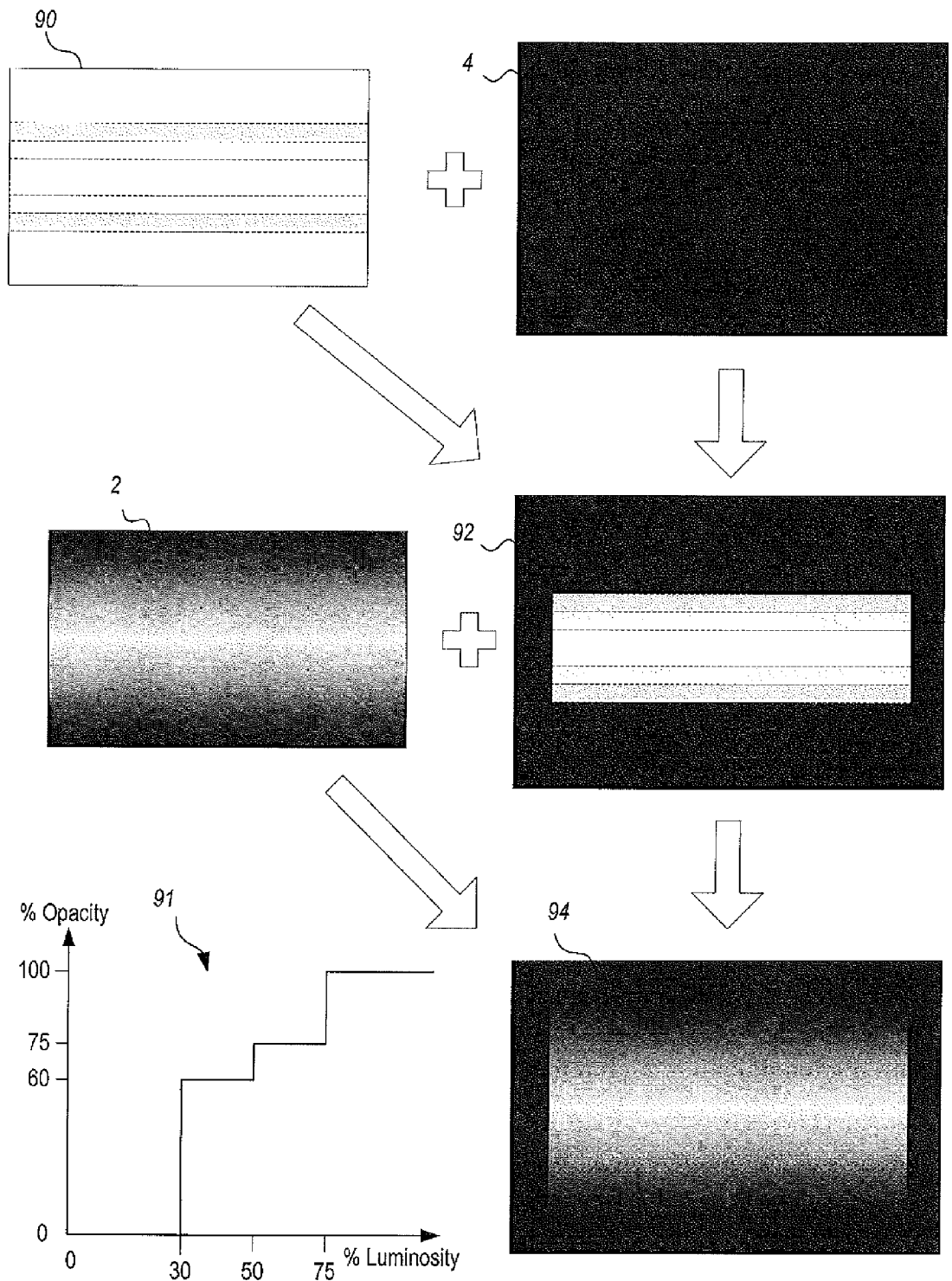
FIG. 9 is a combinational diagram illustrating an image printed on a substrate using a printing technique according to another alternative exemplary embodiment of the invention.

Turning now to FIG. 3, there is shown generally a variable density mono-color under-print layer generator 200 which processes an image file 201 containing an image into an under-print layer file 202 containing a variable density mono-color under-print layer specific to the image in the image file 201 (such as those shown in FIGS. 6, 8 and 9).

Figure 4:
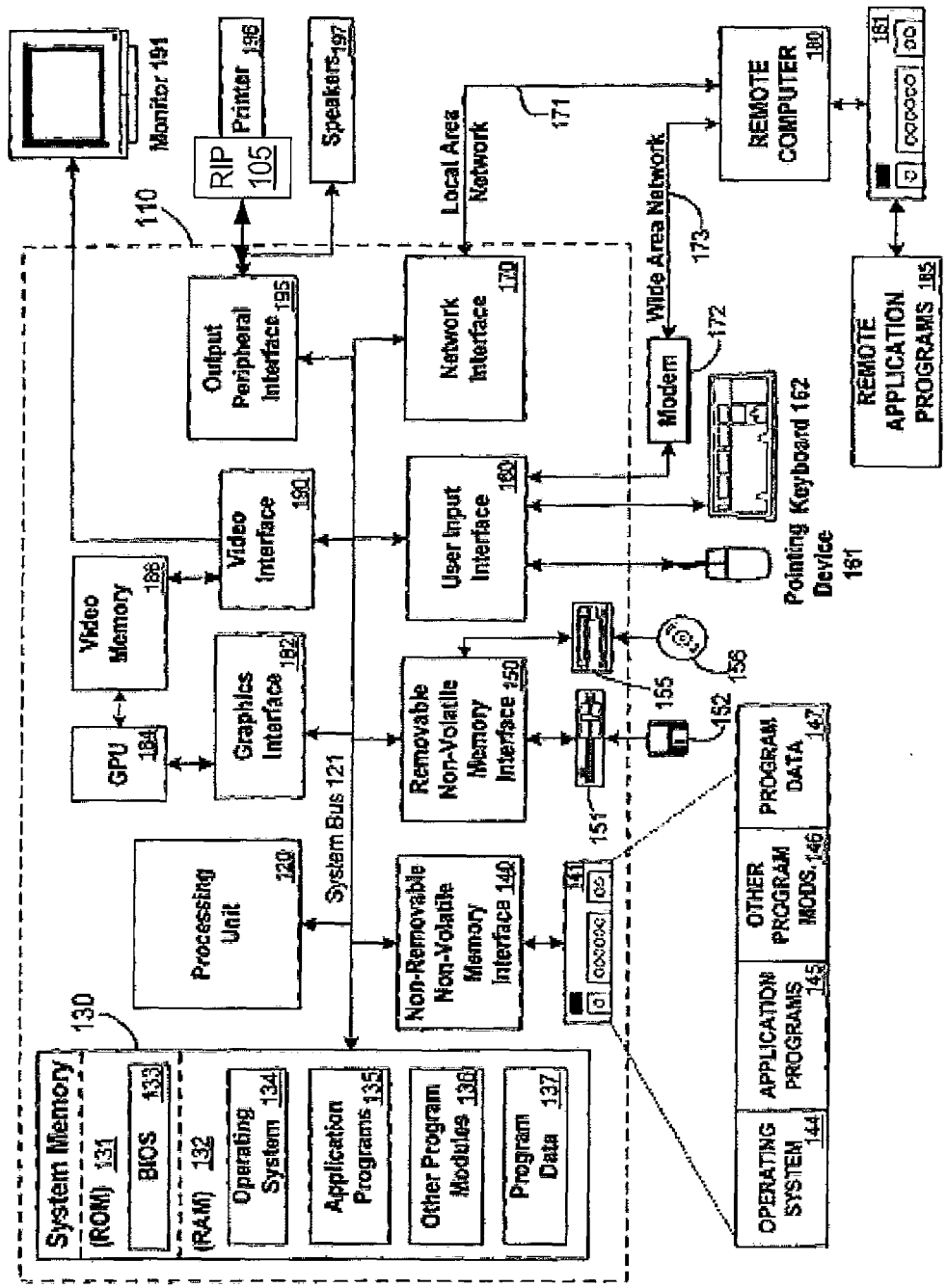
FIG. 4 is a block diagram of a computer system environment in which embodiments of the invention may operate.

FIG. 4 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4, provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181.

It will be appreciated that the network connections shown are exemplary and other means of establishing a communications link between the computers may be used.

Raster image processing (RIP) software 105 may be implemented within one of the application programs 135, one of the program modules 136, or as software or hardware implemented in the printer 196 itself (as shown in FIG. 4). The variable density mono-color under-print layer generator 200 is preferably incorporated into the RIP software 138, but may also be implemented as a stand-alone application program 135 or other program module 136.

Figure 5:
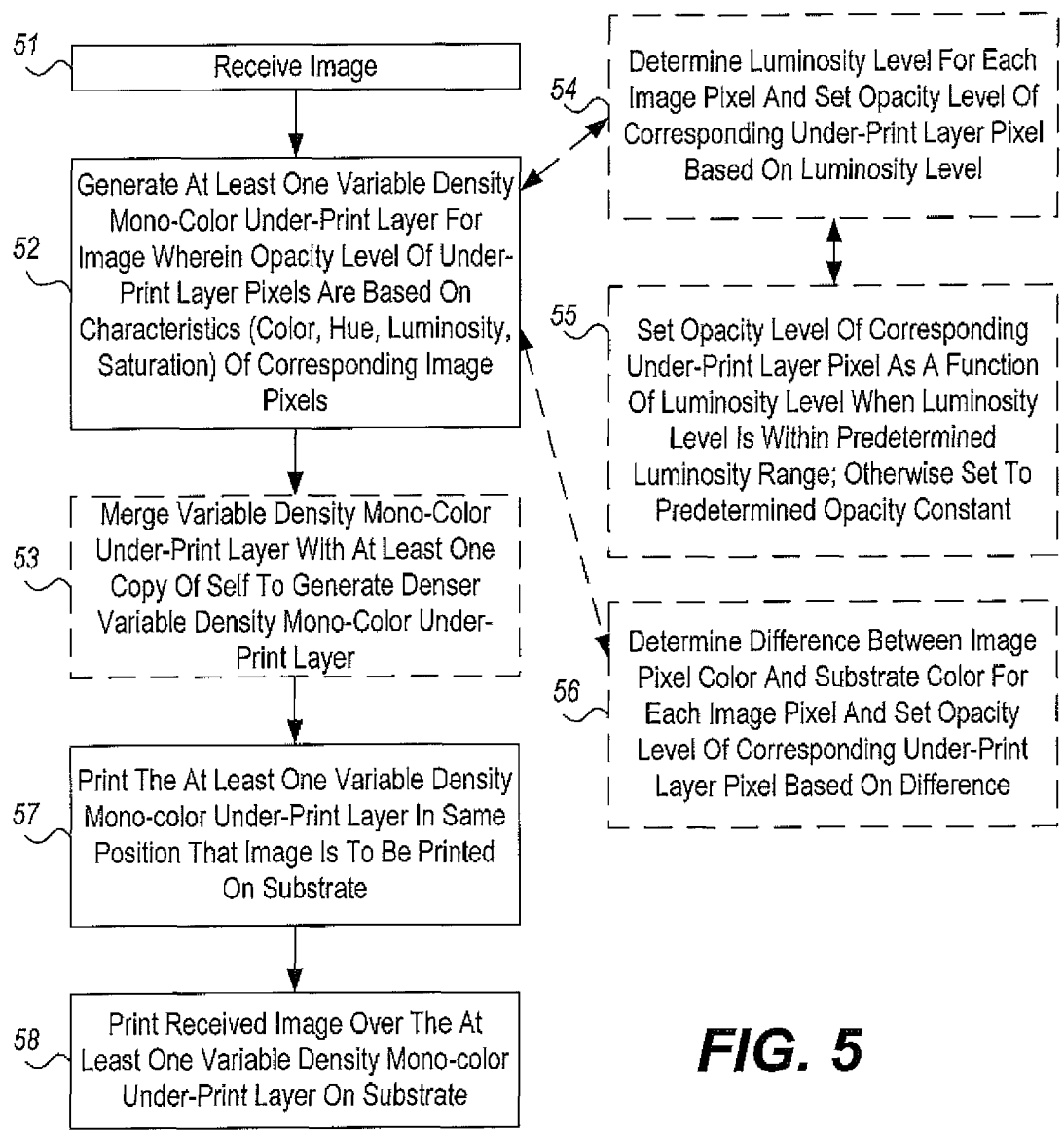
FIG. 5 is a flowchart of an improved image printing process.

FIG. 5 is a flow chart of a method performed by an exemplary embodiment of the variable density mono-color under-print layer generator 200. The process 50 may be implemented as software code executing on a computer or other processor. In this embodiment, the image file contains a multi-color image, but may also include any image having pixels varying pixel characteristics, such as color, luminosity, saturation, tone, etc. The process 50 includes the steps of receiving an image to be printed (step 51) and then generating at least one variable density mono-color under-print layer specific to the image, wherein the opacity level of each under-print layer pixel is set based on the value of at least one characteristic of its corresponding pixel in the image (step 52). The layer may optionally be merged with one or more copies of itself to generate a denser version of the variable density mono-color under-print layer (step 53). The at least one variable density mono-color under-print layer is then printed on the substrate on which the received image is to be printed in the same position that the received image is to be printed (step 57). The received image is then printed over the printed variable density mono-color under-print layer(s) on the substrate to produce a printed product (step 58).

Figure 7:
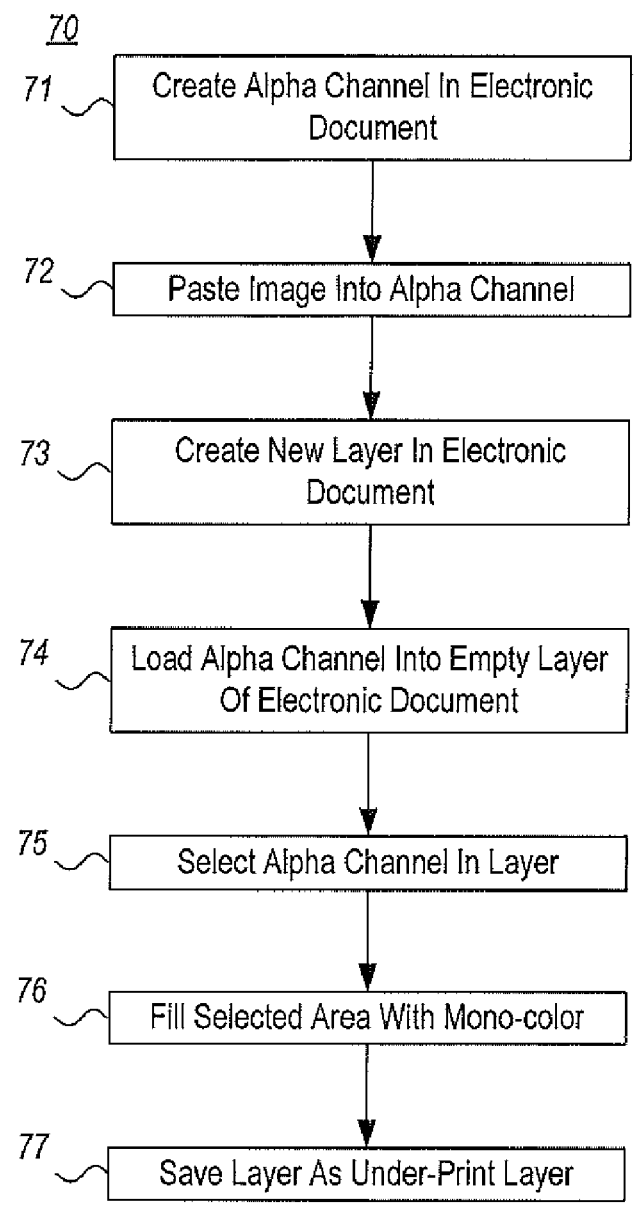
FIG. 7 is a flowchart of an exemplary embodiment for generating a variable density mono-color under-print layer.

In one embodiment, the image pixel color characteristic on which the opacity level of the under-print layer is based is the luminosity level of the image pixel. In this embodiment, the luminosity level of the image pixel is determined and the opacity level of the corresponding under-print layer pixel is set based on the value of the image pixel luminosity level (step 54). In one embodiment, the digital image is stored according to the HSL color model and the luminosity of the image pixel is determined by reading the value of the luminosity field. In one embodiment, the opacity value of a pixel in the variable density mono-color under-print layer may be set proportional to the luminosity level of the corresponding image pixel, as illustrated in FIG. 6 (discussed hereinafter). As another example, if the luminosity level of the image pixel is below a predetermined threshold, the opacity value of the corresponding under-print layer pixel may be set to zero (i.e., 100% transparent), and if the luminosity level of the image pixel is at or above the predetermined threshold the opacity value of the corresponding under-print layer pixel may be set to a constant (e.g., 90 or 100% opacity), as illustrated in FIG. 7 (discussed hereinafter), or to according to a variable function of the luminosity level (e.g., proportional to, or according to a step-wise function, or any other function), as illustrated in FIG. 8 (discussed hereinafter). Thus, returning to FIG. 5, in one embodiment, the opacity level of each under-print layer pixel is set to the value of a function of the luminosity level of the corresponding image pixel when the luminosity level is within a predetermined luminosity range, and is otherwise set to a predetermined constant opacity value (step 55).

In another embodiment, the image pixel characteristic on which the opacity level of the under-print layer is based is the color of the image pixel relative to the color of the substrate on which the image is to be printed. In this embodiment, a relative difference between the color of each image pixel and the color of the substrate on which the image is to be printed is determined and the opacity level of the corresponding under-print layer pixel is set based on the value of this relative difference (step 56).

FIG. 6 illustrates a variable density mono-color under-print layer 60, which is printed on the substrate 4 (shown at 62) underneath the image 2 on the final printed product 64. The opacity of the pixels in the variable density mono-color under-print layer 60 are set according to the linear function 61, wherein the opacity level of each pixel is directly proportional to the luminosity level of the corresponding pixel in the image 2. In FIG. 6, higher opacity is represented by a whiter color in the variable density mono-color under-print layer 60 and less opacity is represented by a grayer color. However, while white and gray appear as colors, in the variable density mono-color under-print layer file, the amount of gray represents the amount of transparency and not actual color in the corresponding gray areas. A full gray pixel represents full transparency, and a full white pixel represents 100% opacity of the mono-color ink used to print the variable density mono-color under-print layer. Thus, in the illustrated example, there is correspondingly less opacity (and higher transparency) at the top and bottom of the variable density mono-color under-print layer 60 and correspondingly more opacity (and lower transparency) along the center horizontal of the variable density mono-color under-print layer 60.

In summary, by first printing the white ink under-print layer on the substrate and then printing the original image in the same position but on top of the printed under-print layer 62, because the lightest colors of the image 2 are printed over the highest-density areas of the white ink under-print layer 60, they appear more luminent. Furthermore, because the dark areas have no or very little white under-printing, they appear darker and deeper.

There are various techniques for generating a variable density mono-color under-print layer as illustrated in FIG. 6. FIG. 7 is a flowchart illustrating an exemplary embodiment of a method 70 for generating the variable density mono-color under-print layer. In this embodiment, the image to be printed is loaded into a layer of an electronic document in an image editing application that supports transparency channels. Alpha channels are masks through which images are displayed. The alpha channel is an n-bit channel, which means it has $2^n$ levels of transparency, represented using gray levels from 0 (black) to 255 (white). White represents the visible area while black represents the transparent area which allows a viewer to see the background behind the image when displayed. The level of gray in between determines the level of visibility of the image. For example, 50 percent gray allows for 50 percent visibility. For example, Photoshop® from Adobe Systems supports a transparency channel called an "alpha" channel which is an 8-bit channel having 256 levels of transparency.

Referring to FIG. 7, an alpha channel is created in an electronic document in an application such as Photoshop® (step 71) and a copy of the image to be printed is pasted into the alpha channel (step 72). A new layer is then created (step 73) and the alpha channel is loaded into the new layer (step 74). The alpha channel in the new layer is selected (step 75) and then filled with the mono-color (step 76). The resulting filled layer, taken alone, is then saved as a file (step 77) which contains the variable density mono-color under-print layer.

FIG. 8 illustrates a variable density mono-color under-print layer 80, which is printed on the substrate 4 (shown at 82) underneath the image 2 on the final printed product 84. The opacity of the pixels in the variable density mono-color under-print layer 80 are set according to the step function 81, wherein the opacity level of each pixel is zero when the luminosity level of the corresponding image pixel is below 33%, and is set to 90% when the luminosity level of the corresponding image pixel is 33% and above. In FIG. 8, just as in FIG. 6, higher opacity is represented by a whiter color in the variable density mono-color under-print layer 80 and less opacity is represented by a grayer color. However, while white and gray appear as colors, in the variable density mono-color under-print layer file 80, the amount of gray represents the amount of transparency and not actual color in the corresponding gray areas.

FIG. 9 illustrates a variable density mono-color under-print layer 90, which is printed on the substrate 4 (shown at 92) underneath the image 2 on the final printed product 94. The opacity of the pixels in the variable density mono-color under-print layer 90 are set according to the step function 91, wherein the opacity level of each pixel is zero when the luminosity level of the corresponding image pixel is below 33%, and is set to increasingly higher opacity levels according to a stepwise function when the luminosity level of the corresponding image pixel is 33% and above. Just as in FIGS. 6 and 8, higher opacity is represented by a whiter color in the variable density mono-color under-print layer 90 and less opacity is represented by a grayer color but the gray color represents the amount of transparency and not actual color.

Figure 10:
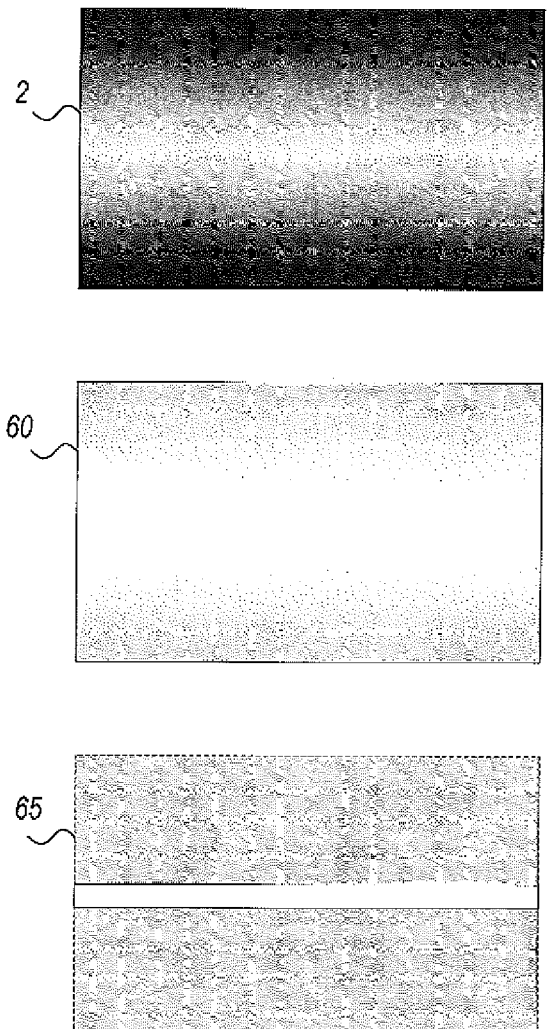
FIG. 10 is a comparative diagram illustrating an image, a first variable density mono-color under-print layer, and a second variable density mono-color under-print layer.

For various reasons, it may be desirable to print more than one under-print layer. For example, the first variable density mono-color under-print layer may itself turn out somewhat faded or grainy due to the type of substrate (e.g., fabrics and textiles result in lower quality printed images than paper substrates). In this case, it may be desirable to print a duplicate of the variable density mono-color under-print layer over the original variable density mono-color under-print layer (resulting in a merged under-print layer), or to print a variant of the variable density mono-color under-print layer. For example, after printing a first variable density mono-color under-print layer, it may be desirable to print another variable density mono-color under-print layer that operates to "touch up" areas corresponding to areas of particular brightness in the image to be printed. This additional touch-up layer may be termed, for example, a "super-white" layer (or other color, if applicable), wherein the super-white layer is a mono-color under-print layer that is maximally opaque in areas of highest luminosity in the corresponding image. For example, given an image 2, a variable density mono-color under-print layer such as 60 may first be printed. Then, a second mono-color under-print layer, such as 65 in FIG. 10, may then be printed over (or alternatively under) the first variable density mono-color under-print layer 60 to increase the opacity of the brightest pixels.

Figure 11:
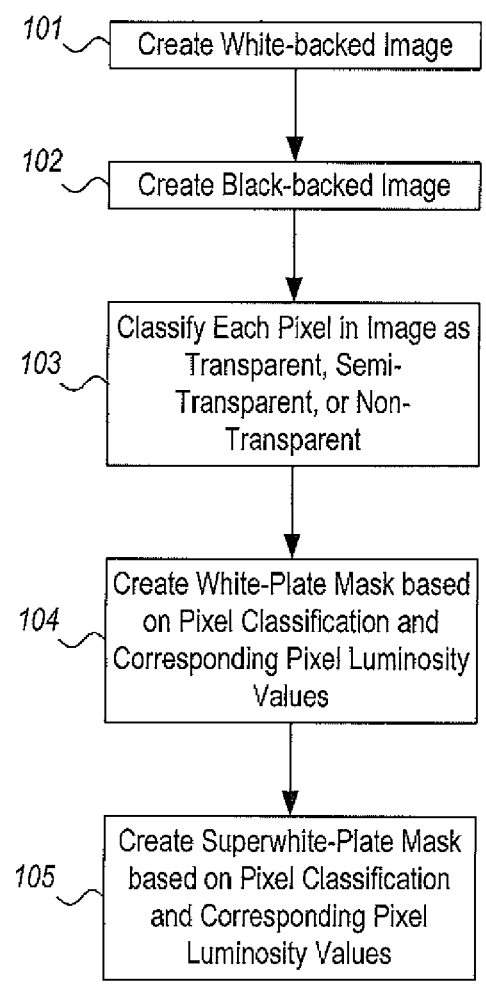
FIG. 11 is a flowchart of an exemplary method for generating a first variable density mono-color under-print layer and a second variable density mono-color under-print layer.

FIG. 11 is a flowchart of an exemplary embodiment of a method for generating a first variable density mono-color under-print layer and a second "super-white" variable density mono-color under-print layer. In this embodiment, a white-backed image of the image on a white background (step 101) and separately a black-backed image of the image on a black background (step 102). In one embodiment, the image to be printed is converted to a grayscale image and then placed on a solid white background. This new composite image is then rasterized, and is saved and referred to herein as the white-backed image. The same is performed placing the grayscale image on a black background, resulting in a rasterized black-backed image.

Each pixel in the original image is then classified as either transparent, semi-transparent, or non-transparent (step 103). In one embodiment, each pixel in the white-backed image is compared to the corresponding pixel in the black-backed image. Each pixel is then categorized as follows:

Transparent—The pixel values in the two images do not match and the pixel value in the white-backed image is completely white;

Semi-Transparent—The pixel values in the two images do not match and the pixel value in the white-backed image is not-completely white;

Non-Transparent—The pixel values match in the two images.

A white variable density under-print layer is then created based on the pixel classifications and corresponding pixel luminosity values (step 104). In an embodiment, this is performed by creating a new grayscale bitmap, referred to herein as the white-plate mask, with the same size and resolution as the white-backed and black-backed images. If a pixel was classified as transparent, the pixel is left blank in the white-plate mask. If a pixel was classified as Semi-transparent or Non-transparent, the value of the pixel in the white-plate mask is defined by the following function: (1) if the luminosity of the pixel in white-backed image is greater than a pre-determined threshold (e.g., >33%), the opacity of the pixel value in the white-plate mask is set to 100%; (2) if the luminosity of the pixel in white-backed image is less than or equal to the pre-determined threshold (e.g., <=33%), the opacity of the pixel value in the white-plate mask is set to a linear function of the luminosity value (e.g., 3 times the luminosity value of the pixel in the white-backed image).

A super-white variable density under-print layer is also created based on the pixel classifications and corresponding pixel luminosity values (step 105). In an embodiment, this is performed by creating a new grayscale bitmap, referred to herein as the super-white-plate mask, with the same size and resolution as the white-backed and black-backed images. If a pixel was classified as transparent, the pixel is left blank in the superwhite-plate mask. If a pixel was classified as Semi-transparent or Non-transparent, the value of the pixel in the superwhite-plate mask is defined by the following function: (1) if the luminosity of the pixel in white-backed image is greater than a second pre-determined threshold (e.g., >99%), the opacity of the pixel value in the superwhite-plate mask is set to a second predetermined level (e.g., 90%); (2) if the luminosity of the pixel in white-backed image is less than or equal to the second pre-determined threshold (e.g., <=99%), the opacity of the pixel value in the superwhite-plate mask is set to 0 (i.e., 100% transparent).

It may further be desirable to print a more than one variable density mono-color under-print layer using different colors. For example, after printing a first variable density mono-color under-print layer using a first color (such as white), it may be desirable to print another variable density mono-color under-print layer using a different color (such as red) that operates to increase the opacity of red areas of the original image printed thereover. The same techniques may be applied as discussed above with the variable density mono-color under-print layer, but the function for determining the opacity level of the under-print layer pixels may differ to capture pixels close to the "red" hue. Obviously, this technique may be extended to any color or color characteristic (such as hue, saturation, luminosity, etc.).

While many of the embodiments discussed herein base the opacity level of the pixels in the variable density mono-color under-print layer on the luminosity level of their corresponding pixels in the original image, other color characteristics may be used to set the opacity level. For example, the opacity level can be set based purely on the color alone. For example, in such an embodiment, all white and yellow pixels may correspond to a high opacity in the variable density monocolor under-print layer, whereas pink, cyan, and light green and blue may correspond to a medium opacity, and all other colors may correspond to low or no opacity.

The image is rasterized by RIP software and the colors are separated into layers. The variable density mono-color under-print layer(s) are printed in the same position on the substrate that the image is to be printed prior to printing the colored layers (CMYK) for the actual image.

It will be appreciated from the above detailed description that embodiments of the invention confer the advantage that the brightness and hue of lighter overprinted colors are improved while preserving darkness and detail in darker ink areas when printing a design image on a dark substrate. Additionally, because the density of the white ink in the under-print layer is printed only in relative proportion to the relative lightness of the color to be printed over it, this results in savings in the amount of white ink used to print the under-print layer and therefore a savings in the overall manufacturing cost of the printed product.

While an exemplary embodiment of the invention has been discussed, the described embodiment is to be considered as illustrative rather than restrictive. The scope of the invention is as indicated in the following claims and all equivalent methods and systems.

What is claimed is:

1. A computer-implemented method for generating a variable-density mono-color under-print layer corresponding to an image to be printed, the method comprising:
   receiving a printable image, the printable image comprising a plurality of first pixels;
   generating, by one or more processors, a mono-color under-print layer, the mono-color under-print layer comprising a plurality of second pixels, each second pixel corresponding to a first pixel in a same corresponding position in the printable image and each second pixel having an associated opacity whose value is based on at least one color characteristic of its corresponding first pixel,
   wherein the step of generating the mono-color under-print layer comprises determining a level of the at least one color characteristic of each first pixel and setting an opacity value of the corresponding second pixel to a value that is a function of the determined level when the determined level is within a pre-determined range, and setting the opacity value to a pre-determined constant opacity when the determined level is outside of the pre-determined range.

2. The method of claim 1, wherein the mono-color under-print layer comprises white.

3. The method of claim 1, wherein the printable image is to be printed on a substrate of a known color, the known color comprising a non-white color, and wherein the mono-color under-print layer comprises white.

4. The method of claim 1, wherein the pre-determined constant opacity comprises full opacity.

5. The method of claim 1, wherein the pre-determined range ranges from zero luminosity to a pre-determined threshold luminosity level.

6. The method of claim 1, further comprising:
   merging the mono-color under-print layer with itself at least once to generate a denser mono-color under-print layer.

7. The method of claim 1, wherein the at least one color characteristic comprises a color hue.

8. The method of claim 1, wherein the at least one color characteristic comprises a color luminosity.

9. The method of claim 1, wherein the at least one color characteristic comprises a color saturation.

10. The method of claim 1, further comprising generating at least one additional mono-color under-print layer specific to the received image.

11. The method of claim 10, comprising printing the mono-color under-print layer and the at least one additional mono-color under-print layer in a same position as the received image is to be printed on a substrate prior to printing the received image on the substrate.

12. The method of claim 1, comprising printing the mono-color under-print layer in a same position as the received image is to be printed on a substrate prior to printing the received image on the substrate.

13. A computer-implemented method for generating a variable-density mono-color under-print layer corresponding to an image to be printed, the method comprising:
   receiving a printable image, the printable image comprising a plurality of first pixels;
   generating, by one or more processors, a mono-color under-print layer, the mono-color under-print layer comprising a plurality of second pixels, each second pixel corresponding to a first pixel in a same corresponding position in the printable image and each second pixel having an associated opacity,
   wherein the step of generating the mono-color under-print layer comprises creating an alpha channel in an electronic document, copying the printable image into the alpha channel, loading the alpha channel into an empty layer in the electronic document, selecting the loaded alpha channel within the layer, filling the selected alpha channel with the mono-color, and saving the layer as the mono-color under-print layer.

14. The method of claim 13, wherein the mono-color under-print layer comprises white.

15. The method of claim 13, wherein the printable image is to be printed on a substrate of a known color, the known color comprising a non-white color, and wherein the mono-color under-print layer comprises white.

16. The method of claim 13, further comprising:
   merging the mono-color under-print layer with itself at least once to generate a denser mono-color under-print layer.

17. The method of claim 13, further comprising generating at least one additional mono-color under-print layer specific to the received image.

18. The method of claim 17, comprising printing the mono-color under-print layer and the at least one additional mono-color under-print layer in a same position as the received image is to be printed on a substrate prior to printing the received image on the substrate.

19. The method of claim 13, comprising printing the mono-color under-print layer in a same position as the received image is to be printed on a substrate prior to printing the received image on the substrate.

20. A computer-implemented method for generating a variable-density mono-color under-print layer corresponding to an image to be printed, the method comprising:
   receiving a printable image, the printable image comprising a plurality of first pixels;
   generating, by one or more processors, a mono-color under-print layer, the mono-color under-print layer comprising a plurality of second pixels, each second pixel corresponding to a first pixel in a same corresponding position in the printable image and each second pixel having an associated opacity, wherein the step of generating the mono-color under-print layer comprises copying the printable image, converting the copied printable image to grayscale, partitioning the grayscale into a discrete number of grayscale levels, setting all pixels outside of a predetermined range of grayscale levels to transparent, and saving the resulting image as the mono-color under-print layer.

21. The method of claim 20, wherein the mono-color under-print layer comprises white.

22. The method of claim 20, wherein the printable image is to be printed on a substrate of a known color, the known color comprising a non-white color, and wherein the mono-color under-print layer comprises white.

23. The method of claim 20, further comprising:
merging the mono-color under-print layer with itself at least once to generate a denser mono-color under-print layer.

24. The method of claim 20, further comprising generating at least one additional mono-color under-print layer specific to the received image.

25. The method of claim 24, comprising printing the mono-color under-print layer and the at least one additional mono-color under-print layer in a same position as the received image is to be printed on a substrate prior to printing the received image on the substrate.

26. The method of claim 20, comprising printing the mono-color under-print layer in a same position as the received image is to be printed on a substrate prior to printing the received image on the substrate.

27. A computer-implemented method for generating a variable-density mono-color under-print layer corresponding to an image to be printed, the method comprising:
receiving a printable image, the printable image comprising a plurality of first pixels;
generating, by one or more processors, a mono-color under-print layer, the mono-color under-print layer comprising a plurality of second pixels, each second pixel corresponding to a first pixel in a same corresponding position in the printable image and each second pixel having an associated opacity,
wherein the step of generating the mono-color under-print layer comprises determining, for each first pixel in the printable image, a difference in at least one corresponding color characteristic between the first pixel and a known substrate color, and setting the opacity of the second pixel corresponding to the first pixel based on the determined difference, the substrate color comprising the color of the substrate on which the printable image is to be printed.

28. The method of claim 27, wherein the opacity of the second pixel is set relatively higher if the determined difference is relatively higher.

29. The method of claim 27, wherein the mono-color under-print layer comprises white.

30. The method of claim 27, wherein the printable image is to be printed on a substrate of a known color, the known color comprising a non-white color, and wherein the mono-color under-print layer comprises white.

31. The method of claim 27, further comprising:
merging the mono-color under-print layer with itself at least once to generate a denser mono-color under-print layer.

32. The method of claim 27, further comprising generating at least one additional mono-color under-print layer specific to the received image.

33. The method of claim 32, comprising printing the mono-color under-print layer and the at least one additional mono-color under-print layer in a same position as the received image is to be printed on a substrate prior to printing the received image on the substrate.

34. The method of claim 27, comprising printing the mono-color under-print layer in a same position as the received image is to be printed on a substrate prior to printing the received image on the substrate.

35. The method of claim 27, wherein the at least one color characteristic comprises a color hue.

36. The method of claim 27, wherein the at least one color characteristic comprises a color luminosity.

37. The method of claim 27, wherein the at least one color characteristic comprises a color saturation.

38. A computer-readable medium comprising program instructions which, when executed by a computer, implement the method of claim 1.

39. A system for generating a variable density mono-color under-print layer corresponding to an image to be printed, the system comprising:
non-transitory computer-readable storage which stores a printable image, the printable image comprising a plurality of first pixels;
one or more processors configured to generate a mono-color under-print layer, the mono-color under-print layer comprising a plurality of second pixels, each second pixel corresponding to a first pixel in a same corresponding position in the printable image and each second pixel having an associated opacity whose value is based on at least one color characteristic of its corresponding first pixel,
the one or more processors generating the mono-color under-print layer by determining a level of the at least one color characteristic of each first pixel, and setting an opacity value of the corresponding second pixel to a value that is a function of the determined level when the determined level is within a pre-determined range, and setting the opacity value to a pre-determined constant opacity when the determined level is outside of the pre-determined range.

40. A method for printing an image onto a substrate, the image comprising a plurality of areas of varying luminosity, the method comprising:
printing at least one variable-density mono-color under-layer onto a substrate in a pre-determined position, wherein areas of varying opacity of the mono-color in the mono-color under-layer correspond to areas of varying luminosity in the image to be printed and further wherein the variable density mono-color under-layer comprises a plurality of pixels, each of the plurality of pixels in the under-layer corresponding to a pixel in a same corresponding position in the image and each having an associated opacity whose opacity value varies according to a luminosity level of its corresponding image pixel for luminosity levels within a pre-determined range and whose opacity value is set to full opacity outside of the pre-determined range; and
printing the image over the mono-color under-layer at the pre-determined position on the substrate.

41. The method of claim 40, wherein the substrate comprises a non-white color.

42. The method of claim 40, wherein the pre-determined range ranges from zero luminosity to a pre-determined threshold luminosity level.

43. A computer-readable medium comprising program instructions which, when executed by a computer, implement the method of claim 40.

44. A system for printing an image onto a substrate, the image comprising a plurality of areas of varying luminosity, the system comprising:

non-transitory computer-readable storage which stores a printable image and at least one variable-density mono-color under-layer, the printable image comprising a plurality of first pixels, and the at least one variable-density mono-color under-layer comprising a plurality of second pixels, each of the plurality of second pixels having an associated opacity whose opacity value varies according to a luminosity level of its corresponding first pixel when its corresponding first pixel in the printable image has a luminosity level within a pre-determined range and whose opacity value is set to full opacity when its corresponding first pixel in the printable image has a luminosity level outside of the pre-determined range;

one or more processors configured to print the at least one variable-density mono-color under-layer onto a substrate in a pre-determined position and to print the printable image over the printed at least one mono-color under-layer at the pre-determined position on the substrate.

45. The system of claim 44, wherein the substrate comprises a non-white color.

46. The system of claim 44, wherein the pre-determined range ranges from zero luminosity to a pre-determined threshold luminosity level.

47. A computer-readable medium comprising program instructions which, when executed by a computer, implement the method of claim 13.

48. A system for generating a variable density mono-color under-print layer corresponding to an image to be printed, the system comprising:

non-transitory computer-readable storage which stores a printable image, the printable image comprising a plurality of first pixels;

one or more processors configured to generate a mono-color under-print layer, the mono-color under-print layer comprising a plurality of second pixels, each second pixel corresponding to a first pixel in a same corresponding position in the printable image and each second pixel having an associated opacity whose value is based on at least one color characteristic of its corresponding first pixel, the one or more processors generating the mono-color under-print layer by creating an alpha channel in an electronic document, copying the printable image into the alpha channel, loading the alpha channel into an empty layer in the electronic document, selecting the loaded alpha channel within the layer, filling the selected alpha channel with the mono-color, and saving the layer as the mono-color under-print layer.

49. A computer-readable medium comprising program instructions which, when executed by a computer, implement the method of claim 20.

50. A system for generating a variable density mono-color under-print layer corresponding to an image to be printed, the system comprising:

non-transitory computer-readable storage which stores a printable image, the printable image comprising a plurality of first pixels;

one or more processors configured to generate a mono-color under-print layer, the mono-color under-print layer comprising a plurality of second pixels, each second pixel corresponding to a first pixel in a same corresponding position in the printable image and each second pixel having an associated opacity whose value is based on at least one color characteristic of its corresponding first pixel, the one or more processors generating the mono-color under-print layer by copying the printable image, converting the copied printable image to grayscale, partitioning the grayscale into a discrete number of grayscale levels, setting all pixels outside of a predetermined range of grayscale levels to transparent, and saving the resulting image as the mono-color under-print layer.

51. A computer-readable medium comprising program instructions which, when executed by a computer, implement the method of claim 27.

52. A system for generating a variable density mono-color under-print layer corresponding to an image to be printed, the system comprising:

non-transitory computer-readable storage which stores a printable image, the printable image comprising a plurality of first pixels;

one or more processors configured to generate a mono-color under-print layer, the mono-color under-print layer comprising a plurality of second pixels, each second pixel corresponding to a first pixel in a same corresponding position in the printable image and each second pixel having an associated opacity whose value is based on at least one color characteristic of its corresponding first pixel, the one or more processors generating the mono-color under-print layer by determining, for each first pixel in the printable image, a difference in at least one corresponding color characteristic between the first pixel and a known substrate color, and setting the opacity of the second pixel corresponding to the first pixel based on the determined difference, the substrate color comprising the color of the substrate on which the printable image is to be printed.

\* \* \* \* \*